United States Patent
Sohal

(10) Patent No.: US 12,275,454 B2
(45) Date of Patent: Apr. 15, 2025

(54) VEHICLE FRAME ASSEMBLY HAVING AN ENERGY ABSORBING DEVICE

(71) Applicant: Volvo Truck Corporation, Gothenburg (SE)

(72) Inventor: Satbir Sohal, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/534,600

(22) Filed: Dec. 9, 2023

(65) Prior Publication Data

US 2024/0217584 A1    Jul. 4, 2024

(30) Foreign Application Priority Data

Jan. 3, 2023   (EP) ................... 23150202

(51) Int. Cl.
*B62D 21/15*    (2006.01)
*B62D 21/02*    (2006.01)

(52) U.S. Cl.
CPC .......... *B62D 21/155* (2013.01); *B62D 21/02* (2013.01); *B60Y 2306/01* (2013.01)

(58) Field of Classification Search
CPC .... B62D 21/155; B62D 21/152; B62D 21/15; B62D 21/11; B62D 21/02; B60Y 2306/01
USPC ..... 280/784, 781; 296/187.09; 180/311, 312
See application file for complete search history.

(56) References Cited

U.S. PATENT DOCUMENTS 11,161,401 B2 * 11/2021 Lian ..................... B60K 1/00
2018/0312198 A1   11/2018 Shimizu
2020/0262483 A1   8/2020  Murai
2022/0081037 A1   3/2022  Jeong
2022/0097767 A1   3/2022  Jeong
2022/0396315 A1 * 12/2022 Pawargi ............... B62D 21/152

(Continued)

FOREIGN PATENT DOCUMENTS

DE   102005060609 B3 * 5/2007 .......... B62D 21/155
DE   102006008088 A1 * 8/2007 ............ B60R 19/56
DE   102013015615 A1   3/2015

(Continued)

OTHER PUBLICATIONS

European Search Report for European Patent Application No. 23150202.2, completed Jun. 6, 2023, 3 pages.

*Primary Examiner* — Keith J Frisby
(74) *Attorney, Agent, or Firm* — Withrow & Terranova, PLLC

(57) ABSTRACT

The vehicle frame assembly comprises a frame having two rails, an electric subassembly secured between the rails, and an energy absorbing device secured to the frame rearward of the electric subassembly. It comprises at least one elongate member having, in the normal state, a mounting portion secured to the frame, with a transverse segment; and a leg extending downwards and facing the electric subassembly along the longitudinal direction. The leg has an upper end connected to the transverse segment, a free lower end, and an inclined segment extending downwards and forward. Further to a rearward movement of the electric subassembly resulting from a frontal collision, the elongate member is deformed according to a downward and rearward pivoting movement of the inclined segment relative to the mounting portion, thereby absorbing energy from the collision.

15 Claims, 6 Drawing Sheets

(56) References Cited

U.S. PATENT DOCUMENTS

| | | | | |
|---|---|---|---|---|
| 2023/0136543 A1* | 5/2023 | Wikblom | ............... | B62D 21/02 |
| | | | | 280/781 |
| 2024/0109588 A1* | 4/2024 | Nagasawa | ............... | B62D 21/11 |

FOREIGN PATENT DOCUMENTS

| | | | | |
|---|---|---|---|---|
| DE | 102014005577 A1 * | 10/2015 | ............... | B60K 1/04 |
| DE | 102018115436 A1 * | 1/2019 | ............... | B60K 1/04 |
| EP | 2601062 A2 | 6/2013 | | |
| FR | 3003806 A1 | 10/2014 | | |
| WO | 2009113096 A2 | 9/2009 | | |
| WO | 2012016622 A2 | 2/2012 | | |
| WO | 2021175560 A1 | 9/2021 | | |
| WO | WO-2024012651 A1 * | 1/2024 | ............... | B60K 1/04 |

\* cited by examiner

VEHICLE FRAME ASSEMBLY HAVING AN ENERGY ABSORBING DEVICE

PRIORITY APPLICATIONS

The present application claims priority to European Patent Application No. 23150202.2, filed on Jan. 3, 2023, and entitled "VEHICLE FRAME ASSEMBLY HAVING AN ENERGY ABSORBING DEVICE," which is incorporated herein by reference in its entirety.

TECHNICAL FIELD

The disclosure relates generally to a safety device for a vehicle. In particular aspects, the disclosure relates to a vehicle frame assembly having an energy absorbing device. The disclosure can be applied in heavy-duty vehicles, such as trucks, buses, and construction equipment. Although the disclosure may be described with respect to a particular vehicle, the disclosure is not restricted to any particular vehicle.

BACKGROUND

Frontal collisions on a vehicle, especially a heavy-duty vehicle such as a truck, result in the vehicle frame being deformed and in various vehicle systems being moved from their normal position. In addition to damage caused to the equipment, this may also entail safety issues.

In a vehicle driven by an internal combustion engine, the engine takes the frontal impact and provides a strong reaction effort due to its weight and to the rear connection with the propeller shaft.

However, in electric vehicles such as battery electric vehicles (BEV) or fuel cell electric vehicles (FCEV), the engine is replaced by an electric subassembly for providing electrical power to the vehicle. The electric subassembly includes a sub-frame that is secured to the rails of the vehicle frame by side mounts, and receives electrical/electronic components. This electric subassembly is relatively lighter in weight and less rigid than an engine. Therefore, it does not offer the same resistance. During a frontal impact, the electric subassembly can be easily separated from the rails, thus being free to travel rearwards. The risks for the equipment and the people are thus quite high.

SUMMARY

According to a first aspect, the disclosure concerns a vehicle frame assembly comprising:
- a frame having two rails extending in a longitudinal direction;
- an electric subassembly comprising a sub-frame arranged between the rails and secured to each rail by at least one side mount;
- an energy absorbing device arranged rearward of the electric subassembly and secured to the frame, the energy absorbing device comprising at least one elongate member formed as a single piece of rigid material, the elongate member having, in the normal state:
  - a mounting portion secured to the frame, the mounting portion having at least one transverse segment;
  - at least one leg which extends globally downwards and which at least partially faces the electric subassembly along the longitudinal direction, the leg having an upper end connected to one end of the transverse segment and a free lower end, the leg including an inclined segment which extends downwards and forward from the leg upper end to the leg lower end, wherein the elongate member is configured to be deformed according to at least a downward and rearward pivoting movement of the inclined segment relative to the mounting portion, further to a rearward movement of the electric subassembly resulting from a vehicular frontal collision, thereby absorbing energy from said collision.

The frontal collision results in the connection between the electric subassembly and the frame being broken. Thus, the longitudinal and rearward load due to the rearward movement of the electric subassembly relative to the vehicle frame is converted into a torque load in the elongate member, which torque is then transferred to the vehicle frame to which the elongate member is secured, as a downward load.

The deformation of the elongate member dissipates part of the energy from the collision, therefore considerably reducing the amount of load which is applied to various vehicle systems, including critical components such as battery packs and/or hydrogen tanks. Protecting said components in case of a collision not only preserves their integrity, but also ensures safety.

Owing to the downwardly-extending leg, and more particularly to the inclined segment which undergoes a pivoting movement under the effort exerted by the electric subassembly, the electric subassembly is constrained to move downward, while its rearward movement is decelerated and ultimately stopped. By forcing the electric subassembly to follow a downward and rearward oriented path, the disclosure prevents said electric subassembly from traveling towards and possibly inside the cab, or at least limits such an intrusion which would deform the cab body and be dangerous for the cab occupant(s).

The inclined segment thus has several functions: dissipating energy, causing the electric subassembly to be deviated downward, and possibly forming an abutment for the electric subassembly.

The deformation of the elongate member is a plastic deformation. In addition to the pivoting movement of the inclined segment with respect to the mounting portion, for example more specifically with respect to the transverse segment, the deformation may include a bowing of the inclined segment and/or a lateral movement of part of the elongate member away from the median longitudinal plane of the vehicle.

One advantage of using an elongate member is that it can be dimensioned to support and take a high load, contrary to devices such as crush cans or crush boxes. Furthermore, such an elongate member makes it possible to absorb energy from a collision occurring not only longitudinally, but also with an angle relative to the longitudinal direction. The rotational resistance of the elongate member allows absorbing energy as soon as the electric subassembly comes into contact with the elongate member, even if the electric subassembly is tilted relative to the longitudinal direction due to the collision.

By "rigid" is meant that the elongate member has a predetermined shape that remains unchanged in the normal state, i.e. in the absence of an effort exerted on the elongate member mounted on the vehicle. Moreover, the elongate member has a stiffness high enough to prevent it from being deformed under a predetermined load threshold. Said threshold is calculated depending on parameters of the vehicle and of the electric subassembly such as their architectures and weights, and on the expected operating conditions (speed, etc.).

The term "connected" does not mean that the connected elements are directly connected. This term includes an implementation in which the connected elements are connected through an intermediate element. The terms "from" and "to" in relation with the term "inclined" indicate the direction of inclination, but do not mean that the concerned inclined segment necessarily begins at the leg upper end and ends at the leg lower end.

In practice, the energy absorbing device may extend between the rails and below the frame. It is preferably arranged very close rearward of the electric subassembly, for example at a distance less than 20 cm, preferably less than 10 cm, or even less than 5 cm.

The elongate member is made of one piece. In an example, it includes successive segments which are angled relative to one another. The elongate member may comprise a bar, such as a metal bar; it may consist of such a bar. The elongate member may have a round cross-section. The elongate member may comprise or be formed of a bar which is bent so as to include successive segments which are angled relative to one another. Having the elongate member in the form of a bent bar is advantageous in terms of ease of manufacture and packaging space.

In an example, the leg extends substantially in a vertical longitudinal plane, in the normal state.

In an example, the elongate member is configured to be deformed according to at least a downward and rearward pivoting movement of the inclined segment relative to the mounting portion, about a pivoting axis. Said pivoting axis may extend substantially transversely. Said pivoting axis may be located near or at the leg upper end.

The leg of the elongate member may further comprise a lower segment which preferably extends substantially longitudinally forward and under part of the electric subassembly, in the normal state. Following a vehicular frontal collision, the lower segment may extend globally downwards, for example substantially vertically, and then form an abutment for the electric subassembly. Thus, a part of the elongate member can form a first abutment when the electric subassembly comes into contact with the elongate member, and the lower segment may form a second, subsequent or final abutment. In an example, the lower segment extends up to the leg lower end.

The leg of the elongate member may further comprise an abutment segment which, in the normal state, extends substantially vertically, and preferably from the lower end of the inclined segment. For example, the abutment segment extends up to the lower segment when such lower segment is present. Such an abutment segment may form a primary abutment, i.e. can be the first part of the elongate member that is hit by the electric subassembly. The abutment segment forms an abutment against a rearward movement of the electric subassembly.

In an example, the energy absorbing device comprises two elongate members which are symmetrical relative to a median vertical longitudinal plane of the vehicle, each elongate member being secured to one of the rails of the frame and having a single leg. In such an example, the mounting portion of one elongate member may have a longitudinal segment secured to the rail and a transverse segment connected to the rear end of the longitudinal segment. The elongate members are spaced apart in the transverse direction. The width of each elongate member may be around one third of the distance between rails.

In another example, the frame further has at least one cross-member coupling the rails and extending rearward of the electric subassembly along a transverse direction. Moreover, the energy absorbing device comprises a single elongate member which is secured to said cross-member, the elongate member having two legs, each leg extending from one end of the mounting portion, and the elongate member being symmetrical relative to a median vertical longitudinal plane of the vehicle. In such an example, each leg has an inclined segment. Each leg may further comprise a longitudinal linking segment between the mounting portion and the inclined segment. The width of the elongate member may be comprised between one half and two thirds of the distance between rails.

According to a second aspect, the disclosure concerns a vehicle comprising a vehicle frame assembly as previously described.

In an example, the vehicle further comprises a cab mounted on the frame, the cab including a driver compartment, and the energy absorbing device is located under the driver compartment. The electric subassembly can be located at least partially under the front part of the driver compartment.

According to a third aspect, the disclosure concerns an energy absorbing device to be secured to a vehicle frame rearward of and at least partially facing an electric subassembly, the frame comprising two longitudinally extending rails, and the electric subassembly comprising a sub-frame arranged between the rails and secured to each rail by at least one side mount. The energy absorbing device comprises at least one elongate member formed as a single piece of rigid material, the elongate member having, in the mounted position and in the normal state:

a mounting portion configured to be secured to the frame, the mounting portion having at least one segment called "transverse segment" which extends along a transverse direction orthogonal to the longitudinal direction;

at least one leg which extends globally downwards, the leg having an upper end connected to one end of the transverse segment and a free lower end, the leg including an inclined segment which extends downwards and away from the transverse segment from the leg upper end to the leg lower end, wherein the elongate member is configured to be deformed according to at least a pivoting movement of the inclined segment relative to the mounting portion, this pivoting movement being oriented downward and towards the transverse segment, further to a rearward movement of the electric subassembly resulting from a vehicular frontal collision, the elongate member thereby absorbing energy from said collision.

In an example, the mounting portion comprises at least one mounting member (such as a hole for receiving a fastener, etc.). Said mounting member is not necessarily provided on the transverse segment. In the mounted position of the energy absorbing device in a vehicle, the transverse segment defines a transverse vertical plane.

The elongate member may comprise a bar which is bent so as to include successive segments which are angled relative to one another.

The leg may extend substantially in a plane which is orthogonal to the transverse segment, in the normal state. In the mounted position of the energy absorbing device in a vehicle, said plane is the vehicle vertical longitudinal plane.

In an example, the leg of the elongate member further comprises a lower segment which, in the normal state, extends substantially longitudinally away from the transverse segment in the same direction as the inclined segment.

In an example, the leg of the elongate member further comprises an abutment segment which, in the normal state, extends substantially vertically, and preferably from the lower end of the inclined segment.

The energy absorbing device may further include any of the previously described features, alone or in combination.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

The disclosure may seek to provide an energy absorbing device of a vehicle frame assembly which efficiently protects (e.g., in case of collision) the electric subassembly secured thereto. The energy absorbing device may deform to dissipate energy and protect the electric subassembly.

Figure 1:
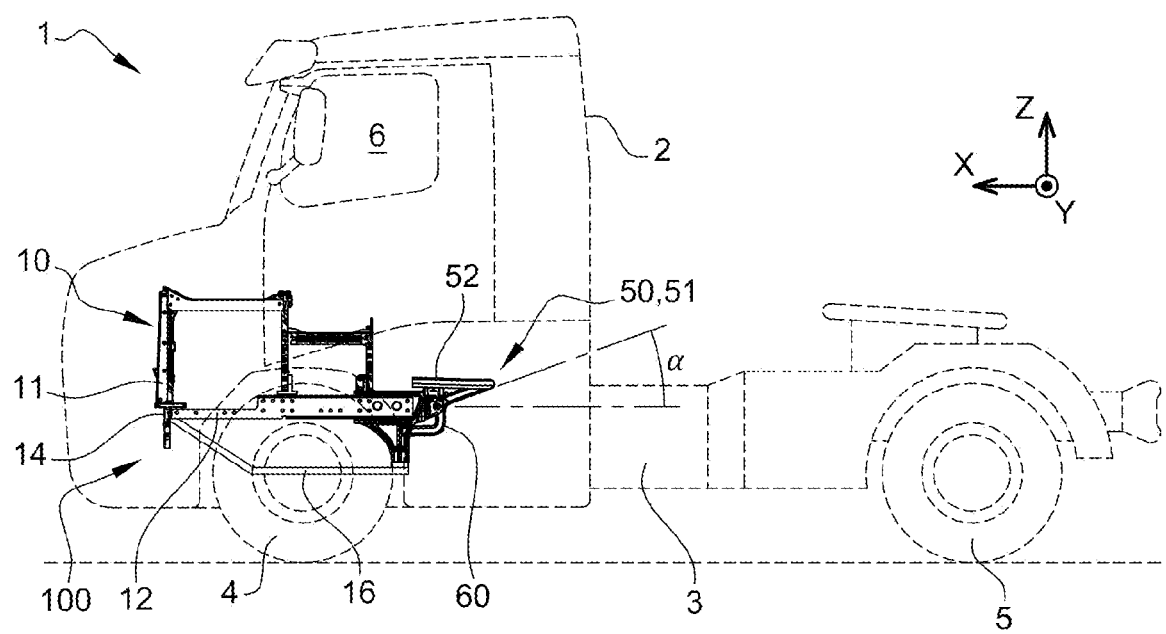
FIG. 1 is a schematic side view of a vehicle comprising a vehicle frame assembly according to one example of the disclosure, the vehicle frame assembly being in a normal state.

FIG. 1 shows a vehicle 1 which comprises a cab 2 mounted on a frame 3 supported by front wheels 4 and rear wheels 5. The cab 2 includes a driver compartment 6. The vehicle illustrated is a truck, but the disclosure can also apply to other vehicles, in particular industrial vehicles, such as a bus or a construction equipment. Z is defined as the vertical direction, X is defined as the longitudinal direction of the vehicle 1, and Y is defined as the transverse direction of the vehicle 1.

Figure 2:
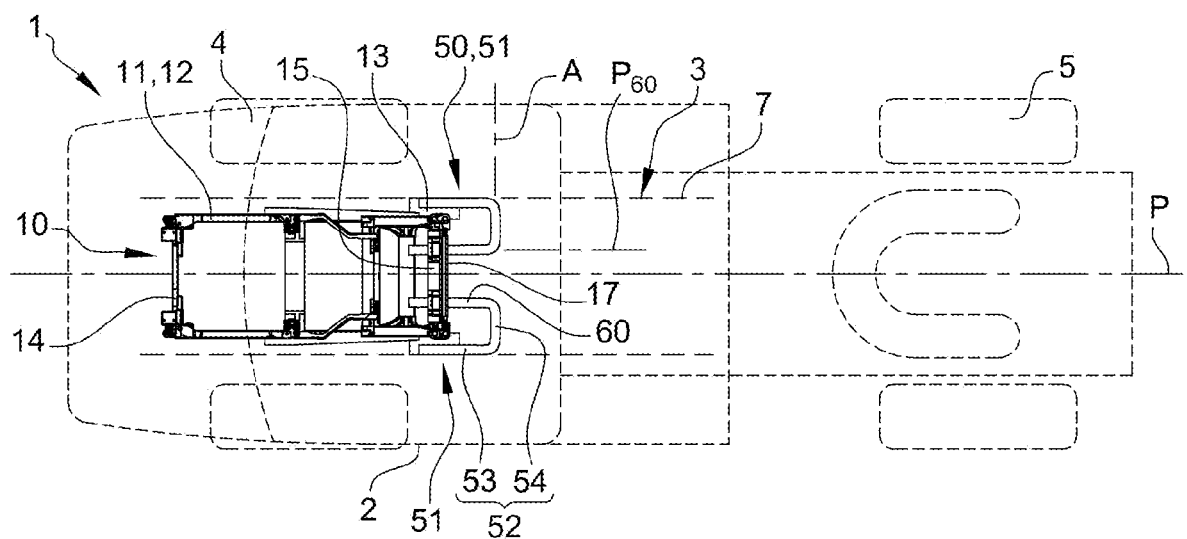
FIG. 2 is a top view of the vehicle of FIG. 1.
Figure 3:
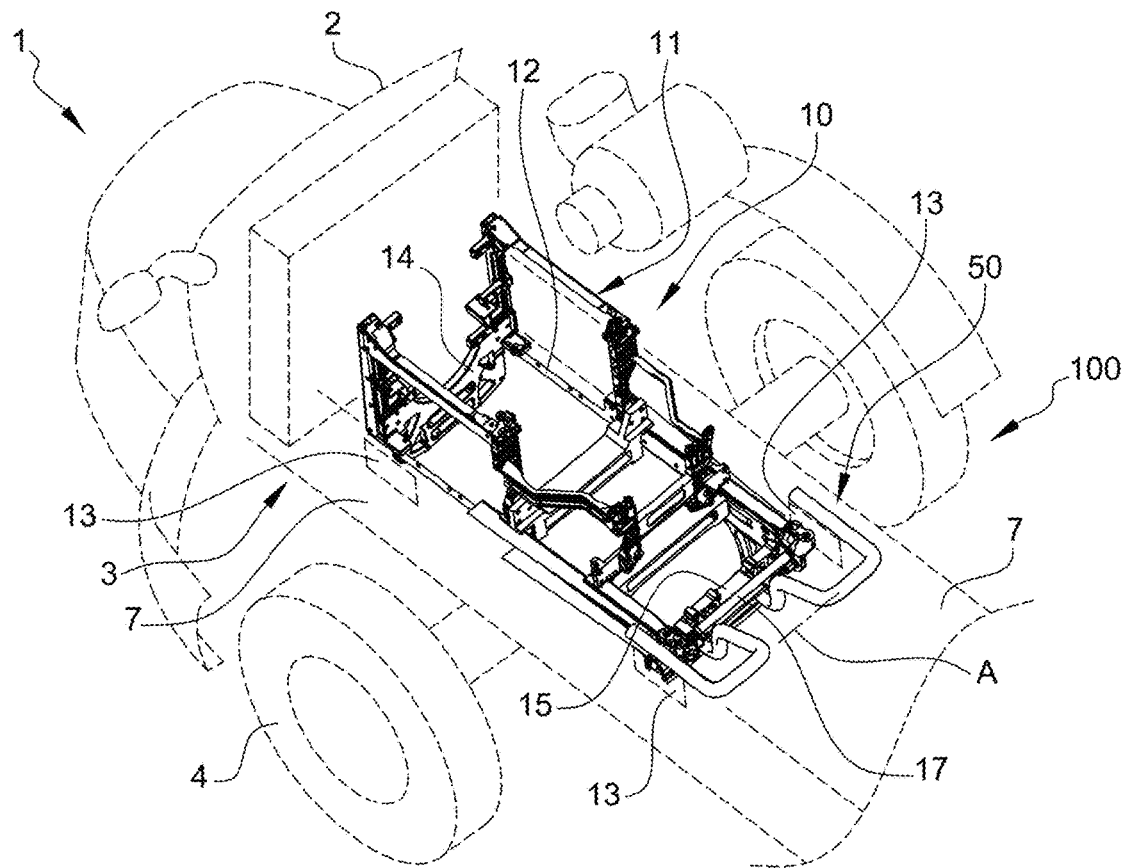
FIG. 3 is a perspective view of the vehicle of FIG. 1.

The frame 3 typically comprises two rails 7 which extend in the longitudinal direction X, as well as at least one cross member 8 which extends in the transverse direction Y and which couples the rails 7. The vehicle 1 has a median vertical longitudinal plane P which is parallel to X and Z and is equidistant from the rails 7 (see FIG. 2).

A vehicle frame assembly 100 of the vehicle 1 comprises the frame 3, an electric subassembly 10 comprising a sub-frame 11 which is arranged between the rails 7, and an energy-absorbing device 50 which is arranged rearward of the electric subassembly 10, the electric subassembly 10 and the energy-absorbing device 50 both being secured to the frame 3.

The electric subassembly 10 comprises electrical/electronic components for operating the system that provides electrical power to the vehicle 1. In a fuel cell electric vehicle (FCEV), said components include fuel cell stacks. In a battery electric vehicle (BEV), said components can include a 24V system, an inverter, a converter, a heating unit, etc.

The sub-frame 11 of the electric subassembly 10 is secured to each rail 7 by at least one side mount 13. In a non-limiting example, the sub-frame 11 can be secured to each rail 7 by two side mounts 13, which can be located at the front and at the rear of the sub-frame 11. In certain examples, the sub-frame 11 can be fully or at least partially located under the cab 2. For example, the electric subassembly 10 can be located at least partially under the front part of the driver compartment 6.

The sub-frame 11 may include two longitudinal beams 12 coupled by a front beam 14 and a rear beam 15, therefore forming at least one compartment for receiving one or more component. The sub-frame 11 may further include at least one cross-member arranged between the front beam 14 and the rear beam 15, and/or vertical beams coupled by connecting beams, thereby forming edges of an open box-like structure. The sub-frame 11 may also include a lower structure 16 which extends under the longitudinal beams 12 and preferably at least partially under the rails 7, the lower structure 16 being for example attached to the longitudinal beams 12.

Figure 4:
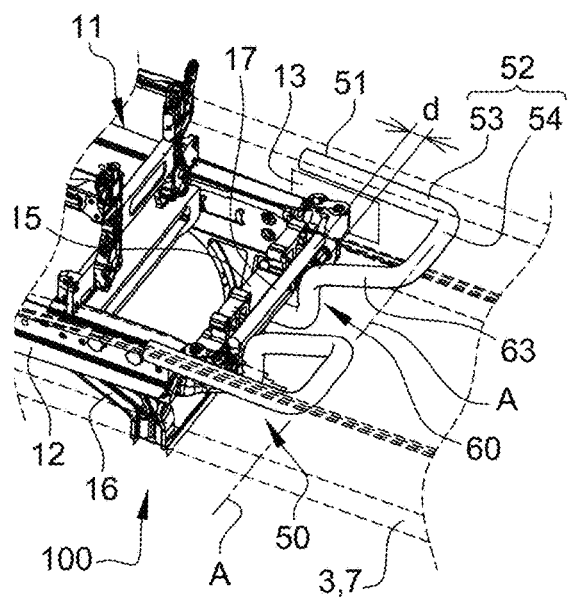
FIG. 4 is a detailed perspective view of the vehicle of FIG. 1.
Figure 5:
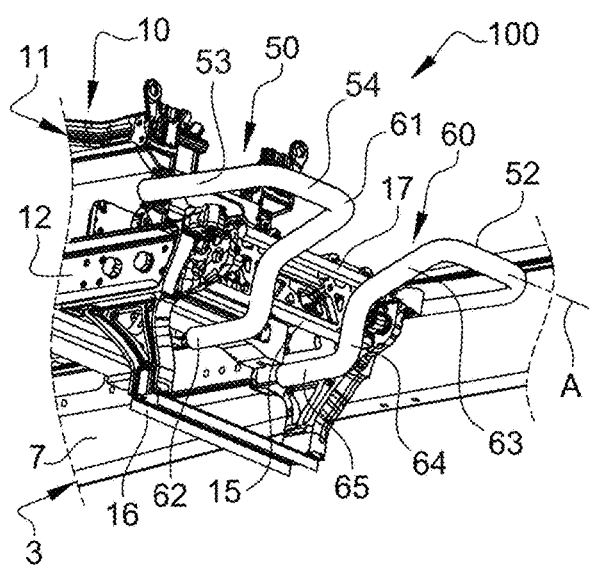
FIG. 5 is a detailed perspective view of the vehicle of FIG. 1, from a different view angle.

Furthermore, the sub-frame 11 may include a transverse rod 17 rearward of and immediately adjacent the rear beam 15, along the longitudinal direction X. For example the transverse rod 17 is spaced from the rear beam 15 by a distance that is less than 10 cm, preferably less than 5 cm, or even less than 2 cm. The transverse rod 17 can be secured to the rear beam 15 and/or to the sub-frame longitudinal beams 12. The transverse rod 17 is preferably the most rearward part of the electric subassembly 10. The sub-frame 11 includes attachments for attaching the components. It may be made of steel or cast iron. The sub-frame 11 is secured to the frame 3 rearward of the electric subassembly 10, while at least partially facing it, along the longitudinal direction X. The energy absorbing device 50 is preferably arranged very close rearward of the electric subassembly 10, for example at a distance d which is less than 20 cm, preferably less than 10 cm, or even less than 5 cm (see FIG. 4). The energy absorbing device 50 may extend between the rails 7 and below the frame 3. In an example, the energy absorbing device 50 is located under the driver compartment 6.

The energy absorbing device 50 comprises at least one elongate member 51 formed as a single piece of rigid material. In an example, the elongate member 51 comprises a bar, such as a metal bar, preferably having a round cross-section. Preferably, the elongate member 51 includes successive segments which are angled relative to one another. These segments can result from a bending of such a bar.

Reference is first made to FIGS. 1 to 5 which show a first example of the disclosure.

In this example, the energy absorbing device 50 comprises two elongate members 51 which are symmetrical relative to the median vertical longitudinal plane P of the vehicle 1, and which are spaced apart in the transverse direction Y. Having two—or more—elongate members 51 increases stability and load capacity. One elongate member 51 will now be described, when it is in the normal state, i.e. when no effort is exerted on it, especially by the electric subassembly 10.

The elongate member 51 has a mounting portion 52 which is secured to the frame 3, for example by means of fasteners such as bolts engaged in holes provided in both the mounting portion 52 and the frame 3. Alternatively, the mounting portion 52 can be welded to the frame 3, or otherwise secured to it. More specifically, the mounting portion 52 may have a longitudinal segment 53 secured to the adjacent rail 7, and a transverse segment 54 which is attached to the rear end of the longitudinal segment and which extends along the transverse direction Y, towards the opposite rail 7 (i.e. towards the median vertical longitudinal plane P).

The elongate member 51 further has a leg 60 which extends globally downwards. By "globally downwards" is meant that the leg 60 does not necessarily have only downwardly extending segments, but may include segments that lie in a horizontal plane. The leg 60 has an upper end 61 connected to the end of the transverse segment 54 that is not attached to the longitudinal segment 53, and a free lower end 62, i.e. a lower end 62 that is not attached to any component. In this example, the elongate member 51 comprises a single leg.

The leg 60 may extend substantially in a plane P60 which is orthogonal to the transverse segment 54. In other words, in the mounted position, the leg 60 may extend substantially in a vertical longitudinal plane of the vehicle 1, i.e. a plane parallel to the median vertical longitudinal plane P (see in particular FIG. 2).

The leg 60 further includes an inclined segment 63 which extends downwards and away from the transverse segment 54 from the leg upper end 61 to the leg lower end 62. In the mounted position, the inclined segment 63 extends downwards and forward, from the leg upper end 61 to the leg lower end 62, i.e. towards the electric subassembly 10 and in particular towards the rear beam 15 and the transverse rod 17. In this example, the inclined segment 63 may be directly linked to the transverse segment 54, i.e. without intermediate segment.

The leg 60 may also comprise an abutment segment 64 which extends substantially vertically. In this example, the abutment segment 64 is linked to the lower end of the inclined segment 63.

The leg 60 may further comprise a lower segment 65 which extends substantially longitudinally away from the transverse segment 54 in the same direction as the inclined segment 63. Thus, in the mounted position, the lower segment 65 extends forward. Furthermore, in the mounted position, the lower segment 65 extends under part of the electric subassembly 10. For example, the lower segment 65 may extend under the rear beam 15, but it may be located above the lower structure 16 (when present) along the vertical direction Z.

In the mounted position, and in the normal state, the leg 60 at least partially faces the electric subassembly 10 along the longitudinal direction X. In this example, the abutment segment 64 faces the rear beam 15, and the inclined segment 63 faces the transverse rod 17.

Figure 10:
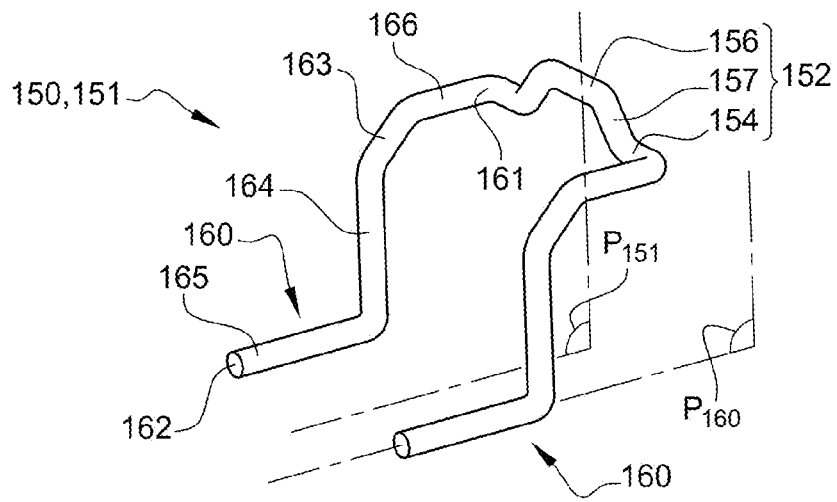
FIG. 10 shows another example of an energy absorbing device according to the disclosure.
Figure 11:
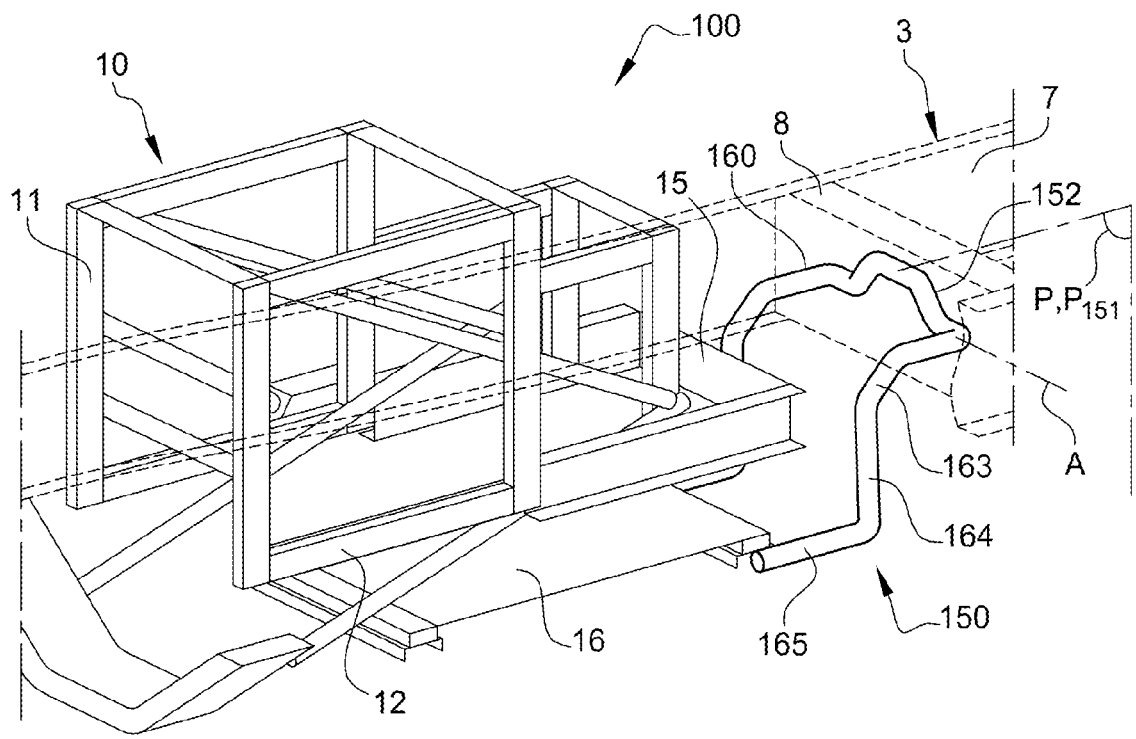
FIG. 11 shows the energy absorbing device of FIG. 10 mounted on a vehicle frame, in a normal state.

Reference is now made to FIGS. 10 and 11 which show a second example of the disclosure. In this example, one cross member 8 of the frame 3 extends rearward of the electric subassembly 10.

In this example, the energy absorbing device 150 comprises a single elongate member 151, which makes the energy absorbing device 150 simple to manufacture and to implement. The elongate member 151 will now be described when it is in the normal state, i.e. when no effort is exerted on it, especially by the electric subassembly 10.

The elongate member 151 has a plane of symmetry P151. In the mounted position, said plane of symmetry P151 is the same as the median vertical longitudinal plane P of the vehicle 1, as shown in FIG. 11.

The elongate member 151 has a mounting portion 152 which is secured to the frame 3, for example by means of fasteners such as bolts engaged in holes provided in both the mounting portion 152 and the frame 3. Alternatively, the mounting portion 152 can be welded to the frame 3, or otherwise secured to it. More specifically, the mounting portion 152 may have a central segment 156 extending along the transverse direction Y, and a branch 157 that extends from each end of the central segment 156 and that joins a corresponding transverse segment 154. Each branch 157 is preferably inclined downward and away from the plane of symmetry P151 from its upper end—attached to the central segment 156—to its lower end—attached to the transverse segment 154. Each transverse segment 154 extends towards the nearest rail 7, away from the plane of symmetry P151, but not up to the nearest rail 7. The mounting portion 152 thus has two transverse segments 154 which are parallel and below the central segment 156. The mounting portion 152 is secured to the cross member 8, preferably at the central segment 156.

The elongate member 151 further has two legs 160. Each leg 160 extends globally downwards from one end of the mounting portion 152. By "globally downwards" is meant that the leg 160 does not necessarily have only downwardly extending segments, but may include segments that are in a horizontal plane. The leg 160 has an upper end 161 connected to the end of the transverse segment 154 that is not attached to the branch 157, and a free lower end 162, i.e. a lower end 162 that is not attached to any component. The two legs 160 are spaced apart along the transverse direction Y, each leg 160 further being spaced apart from the rails 7 along the transverse direction Y.

Each leg 160 may extend substantially in a plane P160 which is orthogonal to the transverse segment 54. In other words, in the mounted position, each leg 160 may extend substantially in a vertical longitudinal plane of the vehicle 1, i.e. a plane parallel to the median vertical longitudinal plane P (see in particular FIG. 11).

Each leg 160 further includes an inclined segment 163 which extends downwards and away from the transverse segment 154 from the leg upper end 161 to the leg lower end 162. In the mounted position, the inclined segment 163 extends downwards and forward, from the leg upper end 161 to the leg lower end 162, i.e. towards the electric subassembly 10 and in particular towards the rear beam 15 and the transverse rod 17. In this example, each leg 160 may further comprise a linking segment 166 between the mounting portion 152 and the inclined segment 163, which for example extends longitudinally. Such a linking segment 166 forms an intermediate segment for attaching the inclined segment 163 and the transverse segment 154. Such a linking segment 166 may allow appropriately positioning the energy absorbing device 150 relative to the electric subassembly 10 while the location of the electric subassembly 10 and of the cross member 8 to which the elongate member 151 is attached are predetermined by structural and/or layout constraints of the vehicle 1.

The leg 160 may also comprise an abutment segment 164 which extends substantially vertically. In this example, the abutment segment 164 is linked to the lower end of the inclined segment 163.

The leg 160 may further comprise a lower segment 165 which extends substantially longitudinally away from the transverse segment 154 in the same direction as the inclined segment 163. Thus, in the mounted position, the lower segment 165 extends forward. Furthermore, in the mounted position, the lower segment 165 extends under part of the electric subassembly 10. For example, the lower segment 165 may extend under the rear beam 15, but it may be located above the lower structure 16 (when present) along the vertical direction Z.

In the mounted position, and in the normal state, the leg 160 at least partially faces the electric subassembly 10 along the longitudinal direction X. in this example, the abutment segment 164 faces the rear beam 15, and the inclined segment 163 faces the transverse rod 17.

Figure 12:
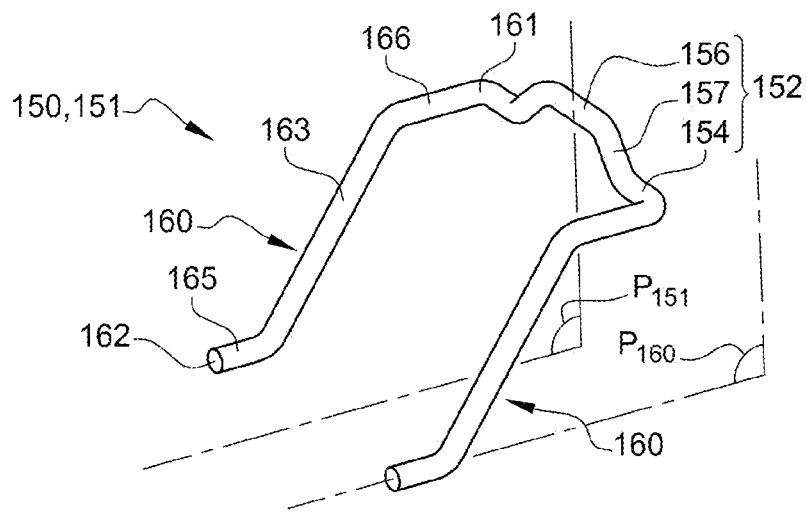
FIG. 12 shows still another example of an energy absorbing device according to the disclosure.
Figure 13:
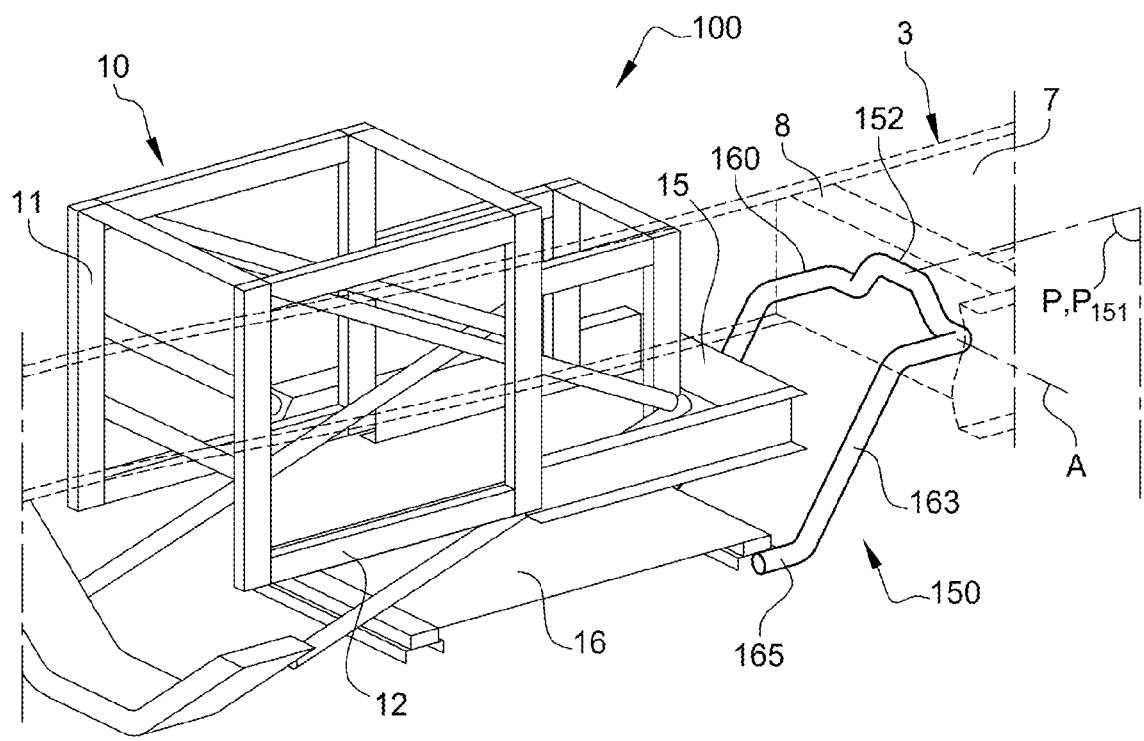
FIG. 13 shows the energy absorbing device of FIG. 12 mounted on a vehicle frame, in a normal state.

Reference is now made to FIGS. 12 and 13 which show a third example of the disclosure.

This example is substantially identical to the second example illustrated in FIGS. 10 and 11 with the following exception. The legs 160 do not include an abutment segment 164. Thus, the inclined segment 163 extends from the linking segment 166 up to the lower segment 165. As a consequence, the inclined segment 163 is longer and the lower segment 165 is shorter than in the example of FIGS. 10 and 11.

The effects of a vehicular frontal collision on the vehicle frame assembly 100 and the mechanical behavior of the components of said vehicle frame assembly 100 will now be described with reference to FIGS. 6 to 9, which show the first example of the disclosure. The effects are similar for the second and third examples.

Following a vehicular frontal collision, the electric subassembly 10 is pushed rearward, which results in the side mounts 13 being broken. The electric subassembly 10 is then separated from the frame 3 and pushed further rearward, until it contacts the energy absorbing device 50. The contact can occur between the rear beam 15 or the transverse rod 17 of the sub-frame 11, on the one hand, and the inclined segment 63 or the abutment segment 64—when present—of the or each elongate member 51, on the other hand. Thus, the elongate member 51 provides a resistance to the rearward movement of the electric subassembly 10, in the opposite direction, namely substantially longitudinally and forward. As the energy absorbing device 50 is located close to the electric subassembly 10 along the longitudinal direction X, said contact occurs shortly after the frontal collision. This allows greatly limiting the electric subassembly travel, dissipating energy shortly after the impact, and ultimately improving efficiency.

Additionally, under the longitudinal and rearward effort exerted by the electric subassembly 10 on the inclined segment 63 or the abutment segment 64, when present, the elongate member 51 is deformed according to at least a downward and rearward pivoting movement of the inclined segment 63 relative to the mounting portion 52. The beginning of such a movement can be seen in FIGS. 6 and 7. This movement can be a pivoting movement about a pivoting axis A that may extend substantially transversely and/or that may be located near or at the leg upper end 61 (see FIGS. 3, 6 and 8).

Figure 6:
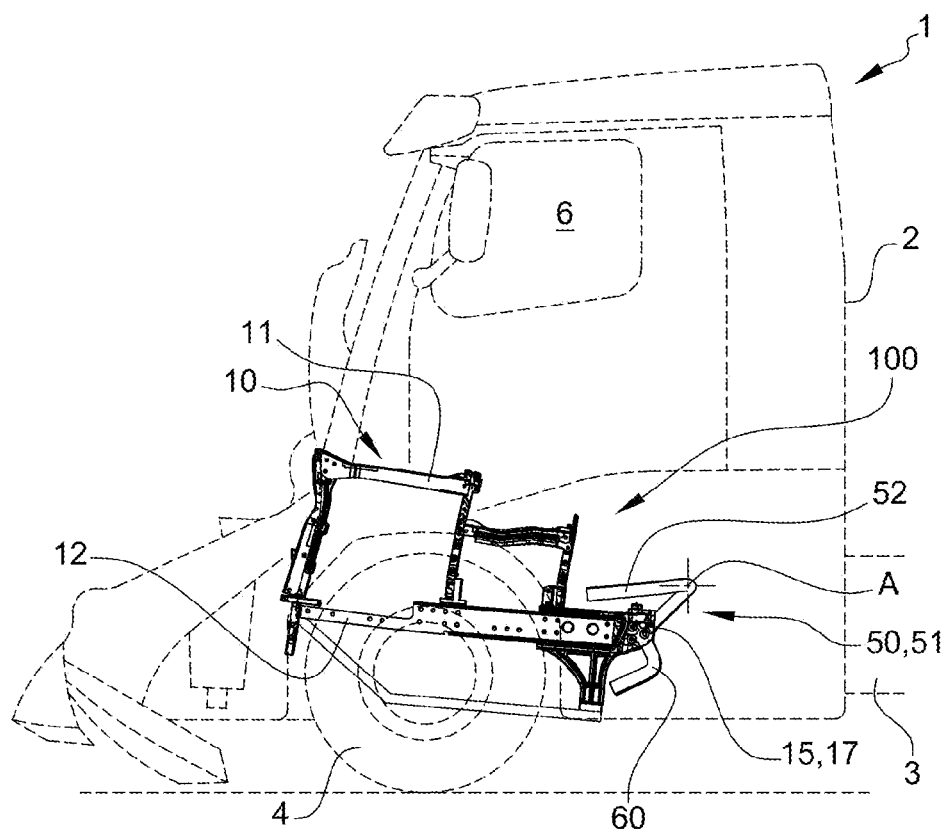
FIG. 6 is a schematic side view of the vehicle of FIG. 1, during a vehicular frontal collision.
Figure 7:
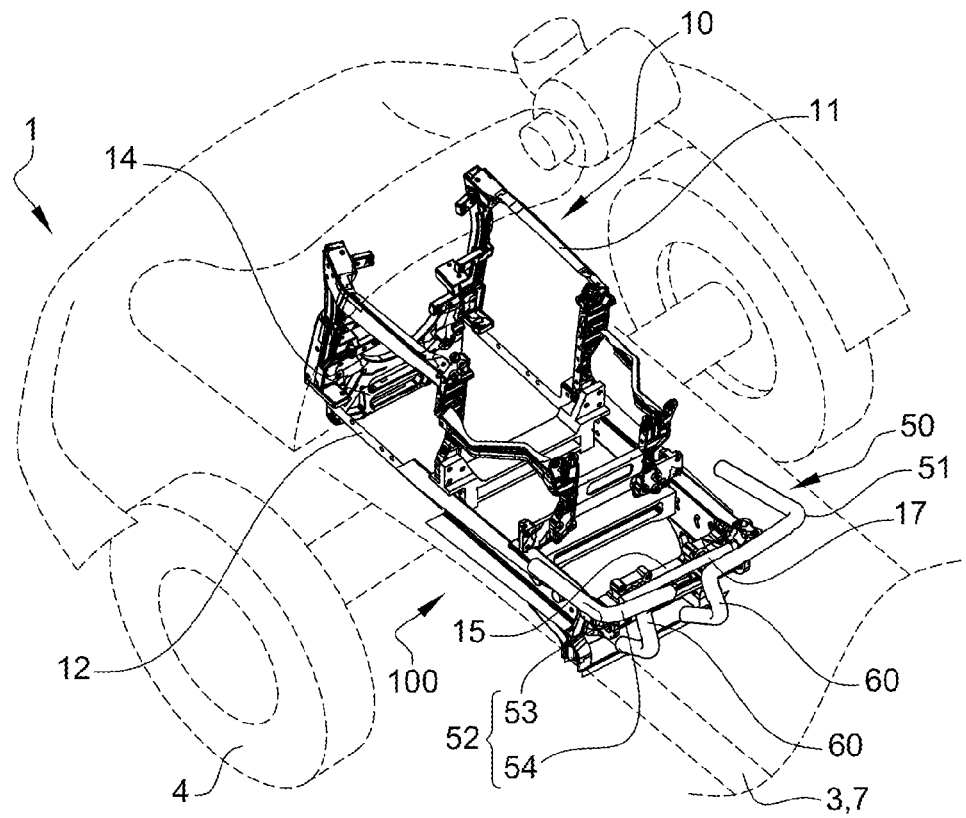
FIG. 7 is a perspective view of the vehicle of FIG. 6.

Thus, the electric subassembly 10 is subjected to a torsional resistance from the elongate member 51 which remains secured to the frame 3. As a consequence, instead of continuing travelling rearward, the electric subassembly 10 is also directed downwards, as can be seen in FIGS. 6 and 7, in which the electric subassembly 10 is still moving, and in FIGS. 8 and 9, in which the electric subassembly 10 has stopped at its final position. Therefore, the energy absorbing device 50 has the effect of changing the load direction from a longitudinal orientation to a torque loading in the elongate member 51.

As the electric subassembly 10 is prevented from travelling longitudinally rearward but is rather deviating according to a path extending both rearward and downward, the energy absorbing device 50 further helps limit the intrusion of the electric subassembly 10 into the cab. This can be seen in FIGS. 8 and 9. The damage to equipment and injuries to occupants are therefore greatly reduced or avoided.

In addition to the downward and rearward pivoting movement of the inclined segment 63 relative to the mounting portion 52, the legs 60 may be transversely moved apart from each other under the rearward effort exerted by the electric subassembly 10. However, the legs 60 preferably remain in a facing relationship with the electric subassembly 10, along the longitudinal direction X, during the whole deformation process, up to the final position illustrated in FIGS. 8 and 9.

Figure 8:
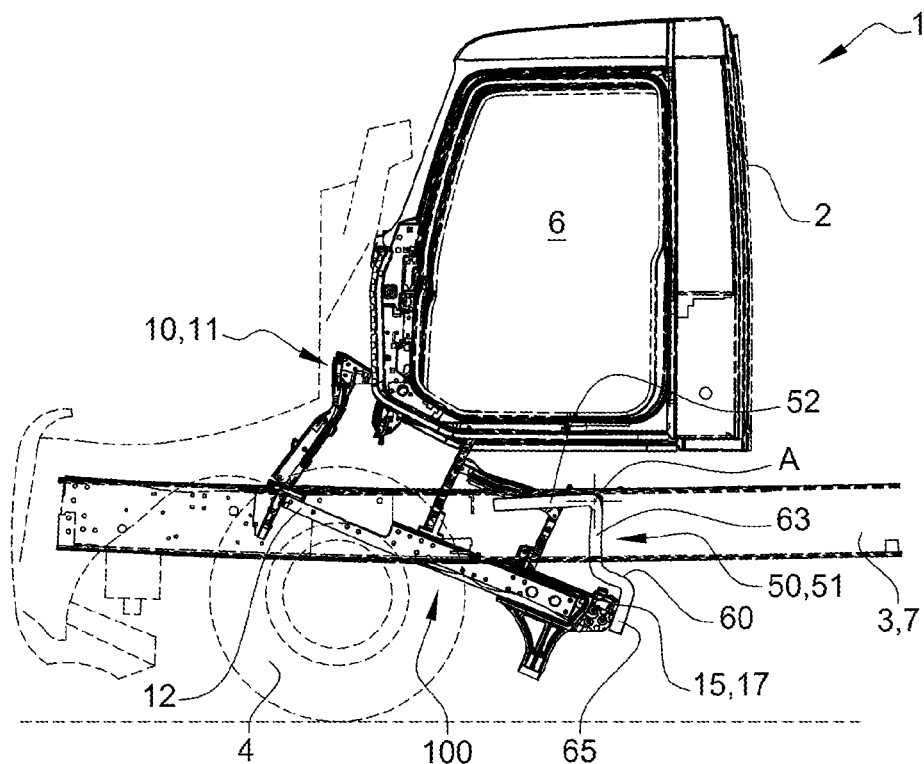
FIG. 8 is a schematic side view of the vehicle of FIG. 1, after a vehicular frontal collision.
Figure 9:
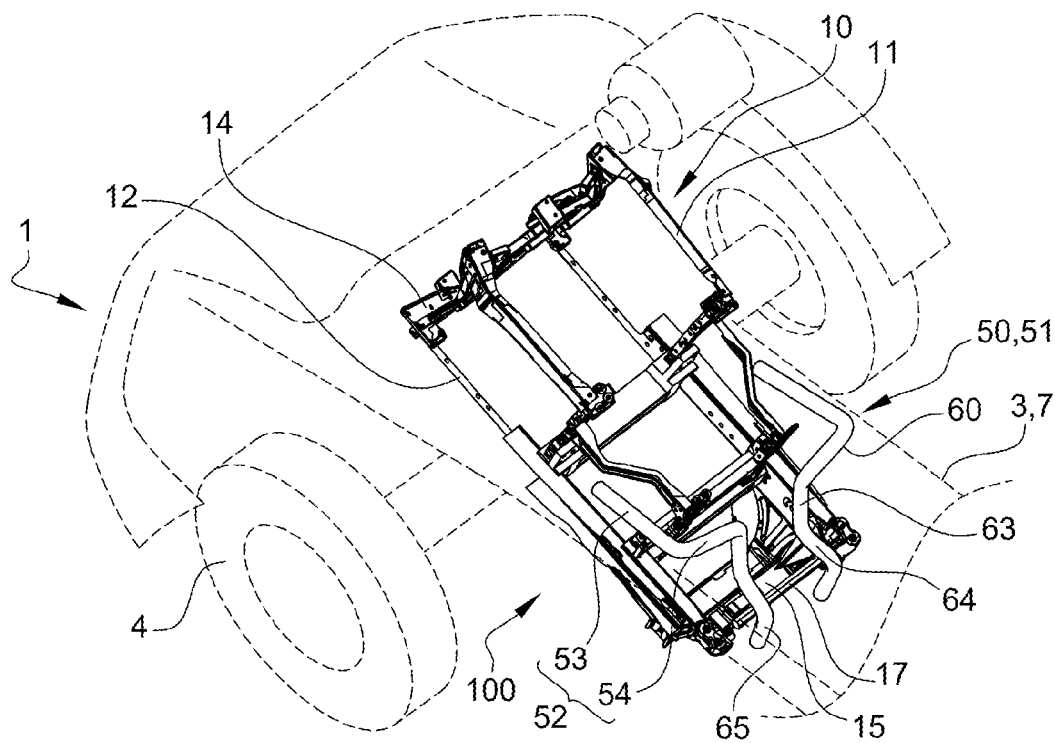
FIG. 9 is a perspective view of the vehicle of FIG. 8.

Due to the pivoting movement of the inclined segment 63 relative to the mounting portion 52, and to the rearward and downward movement of the electric subassembly 10, the rear beam 15 or the transverse rod 17 of the sub-frame 11 subsequently faces the lower segment 65 of the elongate member 51. Indeed, following the collision and the pivoting of the inclined segment 63, the lower segment 65 no longer extends longitudinally but rather globally downwards. The lower segment 65 is not necessarily vertical and may be tilted forward towards the led lower end 62, as shown in FIG. 8. The lower segment 65 may then form an abutment, for example a final abutment, for the electric subassembly 10.

The energy absorbing device 50 not only takes the initial impact, but also directs the load towards the vehicle frame 3. Because the energy absorbing device 50 forms an abutment against the rearward movement of the electric subassembly 10, and undergoes a deformation, the energy absorbing device 50 can absorb energy from the collision. Also, the energy absorbing device 50 allows decelerating the vehicle faster.

The man skilled in the art will appreciate that the characteristics of the elongate member (material, elasticity, mechanical strength, diameter, length of its segments, tilt angle of the inclined segment, etc.) can be determined depending on various parameters, in particular the vehicle architecture and weight. As an example, the tilt angle α of the inclined segment 63 with respect to the longitudinal direction X may be selected according to the desired impact timing and twist capacity. Said tilt angle can be comprised between 15° and 50°. Also, the number of elongate members may vary depending on the requirements regarding load carrying capacity.

The terminology used herein is for the purpose of describing particular aspects only and is not intended to be limiting of the disclosure. As used herein, the singular forms "a,"

"an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A vehicle frame assembly comprising:
   a frame having two rails extending in a longitudinal direction;
   an electric subassembly comprising a sub-frame arranged between the rails and secured to each rail by at least one side mount;
   an energy absorbing device arranged rearward of the electric subassembly and secured to the frame, the energy absorbing device comprising at least one elongate member formed as a single piece of rigid material, the elongate member having, in the normal state:
      a mounting portion secured to the frame, the mounting portion having at least one transverse segment; and
      at least one leg which extends globally downwards and which at least partially faces the electric subassembly along the longitudinal direction, the leg having an upper end connected to one end of the transverse segment and a free lower end, the leg including an inclined segment which extends downwards and forward from the leg upper end to the leg lower end;
   wherein the elongate member is configured to be deformed according to at least a downward and rearward pivoting movement of the inclined segment relative to the mounting portion, further to a rearward movement of the electric subassembly resulting from a vehicular frontal collision, thereby absorbing energy from said collision.

2. The vehicle frame assembly of claim 1, wherein the elongate member includes successive segments which are angled relative to one another.

3. The vehicle frame assembly of claim 1, wherein the elongate member comprises a bar.

4. The vehicle frame assembly of claim 1, wherein the leg extends substantially in a vertical longitudinal plane, in the normal state.

5. The vehicle frame assembly of claim 1, wherein the elongate member is configured to be deformed according to at least a downward and rearward pivoting movement of the inclined segment relative to the mounting portion, about a pivoting axis that extends substantially transversely and/or that is located near or at the leg upper end.

6. The vehicle frame assembly of claim 1, wherein the leg of the elongate member further comprises a lower segment which extends substantially longitudinally forward and under part of the electric subassembly, in the normal state, and wherein, following a vehicular frontal collision, the lower segment extends globally downwards and forms an abutment for the electric subassembly.

7. The vehicle frame assembly of claim 1, wherein the leg of the elongate member further comprises an abutment segment which, in the normal state, extends substantially vertically.

8. The vehicle frame assembly of claim 1, wherein the energy absorbing device comprises two elongate members which are symmetrical relative to a median vertical longitudinal plane of the vehicle, each elongate member being secured to one of the rails of the frame and having a single leg.

9. The vehicle frame assembly of claim 1, wherein the frame further has at least one cross-member coupling the rails and extending rearward of the electric subassembly along a transverse direction, and wherein the energy absorbing device comprises a single elongate member which is secured to said cross-member, the elongate member having two legs, each leg extending from one end of the mounting portion, and the elongate member being symmetrical relative to a median vertical longitudinal plane of the vehicle.

10. A vehicle comprising the vehicle frame assembly of claim 1.

11. The vehicle of claim 10, further comprising a cab mounted on the frame, the cab including a driver compartment, wherein the energy absorbing device is located under the driver compartment.

12. An energy absorbing device to be secured to a vehicle frame rearward of and at least partially facing an electric subassembly, the frame comprising two longitudinally extending rails, and the electric subassembly comprising a sub-frame arranged between the rails and secured to each rail by at least one side mount, the energy absorbing device comprising at least one elongate member formed as a single piece of rigid material, the elongate member having, in the mounted position and in the normal state:

a mounting portion configured to be secured to the frame, the mounting portion having at least one transverse segment which extends along a transverse direction orthogonal to the longitudinal direction;

at least one leg which extends globally downwards, the leg having an upper end connected to one end of the at least one transverse segment and a free lower end, the leg including an inclined segment which extends downwards and away from the at least one transverse segment from the leg upper end to the leg lower end; and wherein the elongate member is configured to be deformed according to at least a pivoting movement of the inclined segment relative to the mounting portion, this pivoting movement being oriented downward and towards the at least one transverse segment, further to a rearward movement of the electric subassembly resulting from a vehicular frontal collision, the elongate member thereby absorbing energy from said collision.

13. The energy absorbing device of claim 12, wherein the elongate member comprises a bar which is bent so as to include successive segments which are angled relative to one another.

14. The energy absorbing device of claim 12, wherein the leg extends substantially in a plane which is orthogonal to the at least one transverse segment, in the normal state.

15. The energy absorbing device of claim 12, wherein the leg of the elongate member further comprises:

a lower segment which, in the normal state, extends substantially longitudinally away from the at least one transverse segment in the same direction as the inclined segment; and/or an abutment segment which, in the normal state, extends substantially vertically.

* * * * *